United States Patent [19]
Prince

[11] Patent Number: 5,282,517
[45] Date of Patent: Feb. 1, 1994

[54] DRIVE WHEEL SUSPENSION SYSTEM FOR A MOTORCYCLE

[76] Inventor: Curtis L. Prince, 1256 Riverbreeze Blvd., Ormond Beach, Fla. 32176

[21] Appl. No.: 899,996

[22] Filed: Jun. 18, 1992

[51] Int. Cl.⁵ ............................................. B62K 25/10
[52] U.S. Cl. ................... 180/227; 280/284; 180/219; 474/109
[58] Field of Search ............... 180/227, 219; 280/284, 280/275; 474/109, 111

[56] References Cited

U.S. PATENT DOCUMENTS

| | | | |
|---|---|---|---|
| 4,299,582 | 11/1981 | Leitner | 180/227 X |
| 4,671,525 | 6/1987 | Ribi | 280/284 |
| 4,705,494 | 11/1987 | Gibson | 474/109 |
| 4,735,277 | 4/1988 | Prince | 180/227 |
| 4,951,791 | 8/1990 | Creixell | 280/284 X |

FOREIGN PATENT DOCUMENTS 0422324  4/1991  European Pat. Off. ............ 180/227

Primary Examiner—Margaret A. Focarino
Assistant Examiner—C. Mattix

[57] ABSTRACT

The present invention discloses a drive wheel suspension system for a motorcycle wherein the drive wheel has freedom of motion in any direction, within it's plane of rotation. The wheel is risiliently connected to the main chassis through two swing arms and power is transmitted through a manipulated single loop drive.

18 Claims, 6 Drawing Sheets

DRIVE WHEEL SUSPENSION SYSTEM FOR A MOTORCYCLE

BRIEF SUMMARY OF THE INVENTION

The closest known prior art is the inventors own U.S. Pat. No. 4,735,277. This patent discloses several embodiments of a motorcycle drive wheel suspension system that allows the wheel to move in all directions, within it's plane of rotation, relative to the main chassis. In testing these systems proved to be vastly superior to conventional single path systems.

A study of U.S. Pat. No. 4,735,277 will reveal that under hard acceleration the force that pushes the vehicle forward also encumbers the intended two dimensional aspect of the system. It is also obvious that braking will slightly elongate the system. This reduces the effective travel available.

The present invention masterfully overcomes these restrictions. It will also reduce cost, reduce weight, simplify design, improve manufacturability, reduce maintenance, and improve overall performance.

DETAILED DESCRIPTION OF THE DRAWINGS

In motorcycle construction the main frame, engine, transmission case and other components are bolted together to create the totality of the frame or chassis system. These are stressed members and contribute to the overall strength and rigidity of the chassis system.

Figure 1:
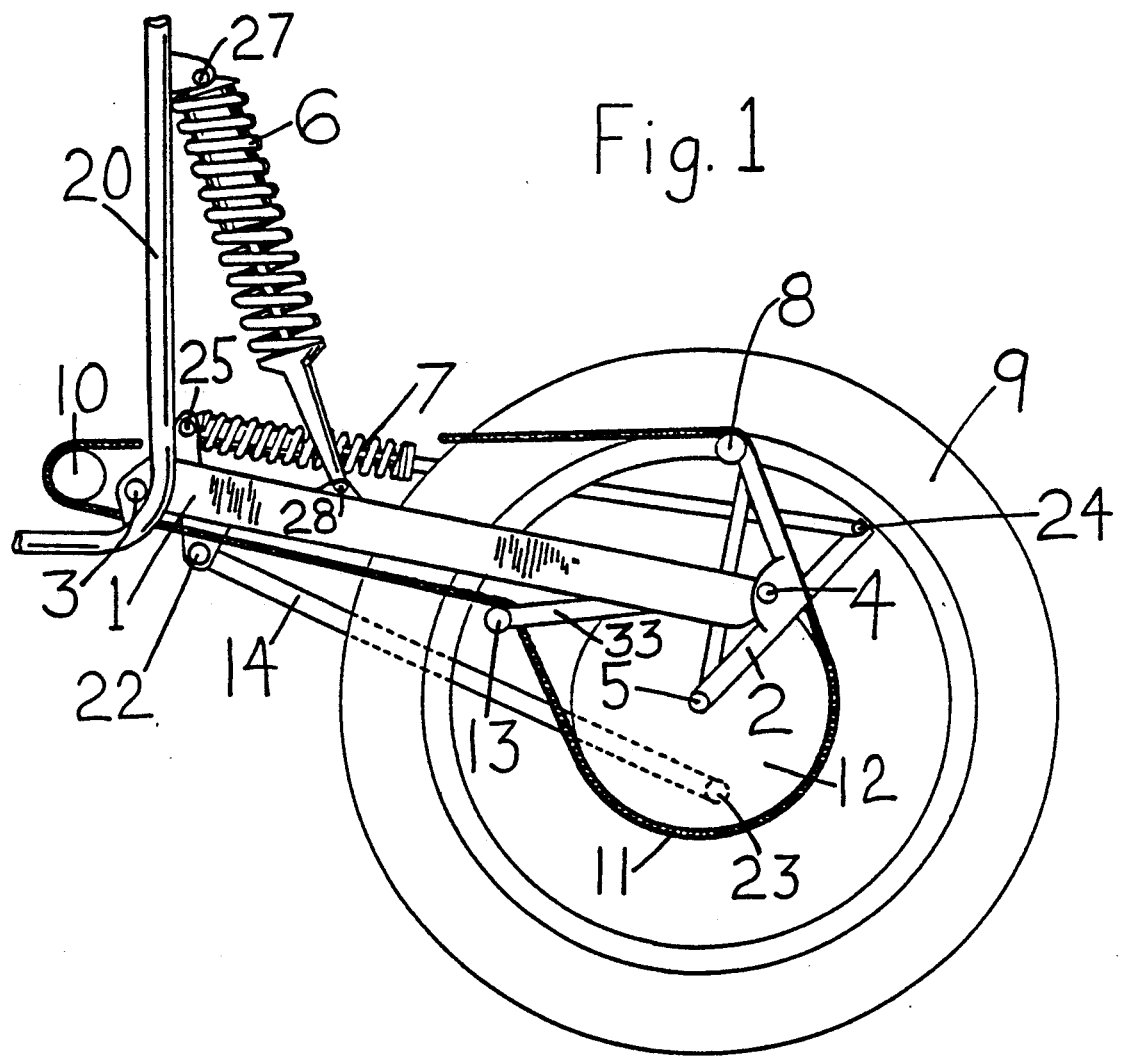
FIG. 1 is a side view of the rear portion of a motorcycle.

FIG. 1 shows a side view of the rear portion of a motorcycle comprised of a first swing arm 1 pivotally mounted to the chassis system 20 at pivot axis 3. Swing arm 1 could be mounted to any part of the chassis system such as the engine or transmission case as these are static, stressed members. The engine and transmission cases are not shown in FIG. 1. Swing arm assembly 2 is pivotally mounted to swing arm 1 at pivot axis 4. Arm 2 pivots about axis 4 in a generally horizontal arc. The wheel 9 is rotatably mounted to swing arm 2 at rotation axis 5. Shock absorber 6 is mounted to swing arm 1 at shock mount 28. Shock absorber 6 resiliently connects swing arm 1 to chassis system 20 at shock mount 27. Swing arm assembly 2 is pivotally mounted to the rearward portion of swing arm 1 at pivot axis 4. Shock absorber 7 is mounted to swing arm assembly 2 at shock mount 24. Shock absorber 7 resiliently connects swing arm assembly 2 to swing arm 1 at shock mount 25. Output drive sprocket 10 is in close proximity to pivot axis 3 of swing arm 1. Output drive sprocket 10 and swing arm 1 may have a common axis (not illustrated).

Chain 11 delivers power to wheel 9 through sprocket 12. The system may be constructed of other loop drive components such as belt & pully, belt & cog etc. An upward extending member 36 is rigidly mounted to the left side of swing arm assembly 2. Guide mechanism 8 is mounted to the upward extending member 36. Chain manipulation arm 33 is attached to swing arm assembly 2. Chain manipulation roller 13 is rotatably mounted to the end of chain manipulation arm 33. As swing arm assembly 2 pivots counterclockwise, guide mechanism 8 and chain manipulation roller 13 allow the chain to travel a progressively more direct route to sprocket 12. The result is precise control of chain tension.

Under acceleration, a clockwise torque is created on swing arm assembly 2, about axis 4, by the vehicles resistance to acceleration. This is canceled by a counterclockwise torque on swing arm assembly 2 created by chain 11 pull on guide mechanism 8 of swing arm assembly 2. The result is that the horizontal suspension movement is unencumbered even under hard acceleration. The vehicle is pushed forward through pivot axis 4.

Coil over shock absorbers 6 and 7 are shown. These are the most readily available and popular styles, however, this system is compatible with other systems that accomplish a similar end.

The system is compatible with disc or drum brakes. Brake anchor arm 14 transfers the brake forces from pivot axis 23 of the brake backing plate (hidden in FIG. 1) to swing arm 1 at brake anchor mount 22, however, the anchor arm 14 may be attached to the chassis system 20. This brake system is not a haphazard lash-up. Horizontal suspension movement is independent of brake forces. The suspension will not elongate because of brake forces, however, it maintains full freedom to move horizontally if the terrain dictates it.

Figure 2:
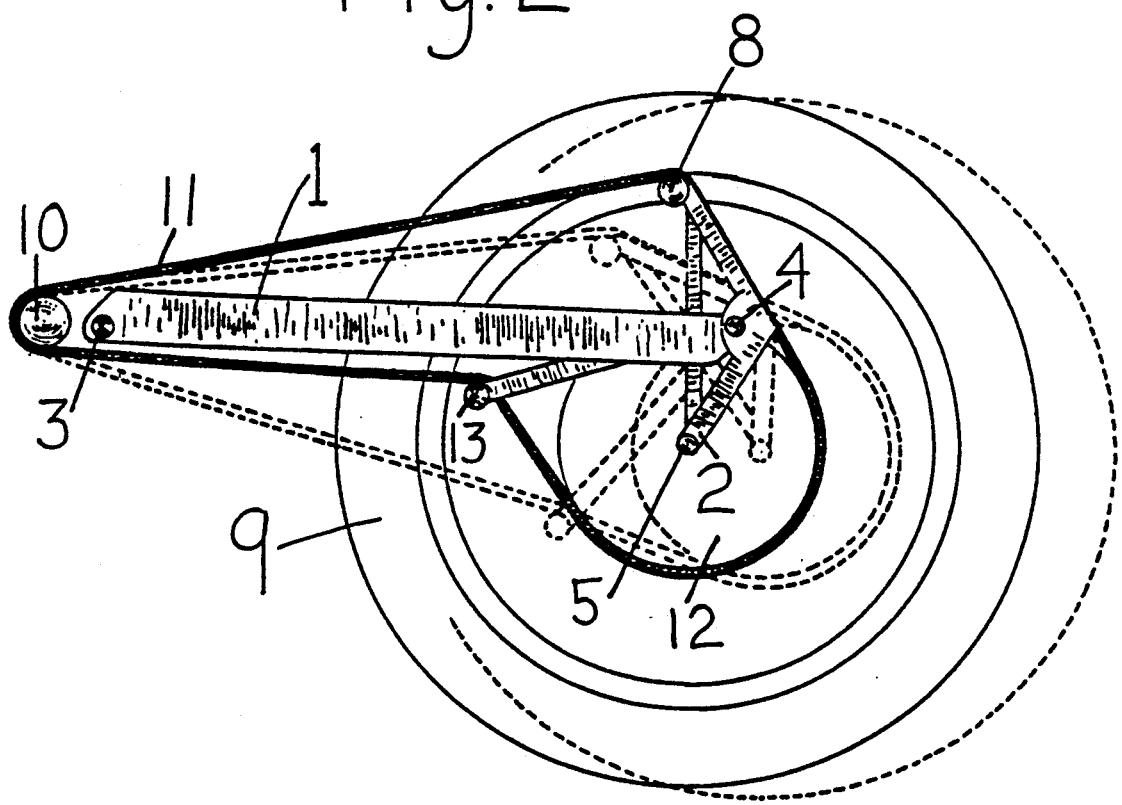
FIG. 2 is a side view of the rear wheel suspension with enough components and phantom lines to illustrate the horizontal movement and chain manipulation.

FIG. 2 is a side view of the rear wheel suspension with enough components and phantom lines to illustrate the horizontal movement and chain manipulation. It shows pivot axis 3 to which first swing arm 1 is pivotally attached. At the rear portion of swing arm 1, swing arm assembly 2 is pivotally attached. Wheel 9 is rotatably mounted to swing arm 2 at axis 5. Power is transferred from output drive sprocket 10 to wheel sprocket 12 through chain 11 over guide mechanism 8 which is mounted to the upper extending member 36. The chain 11 returns to the wheel sprocket 12 over chain manipulation roller 13.

Figure 3:
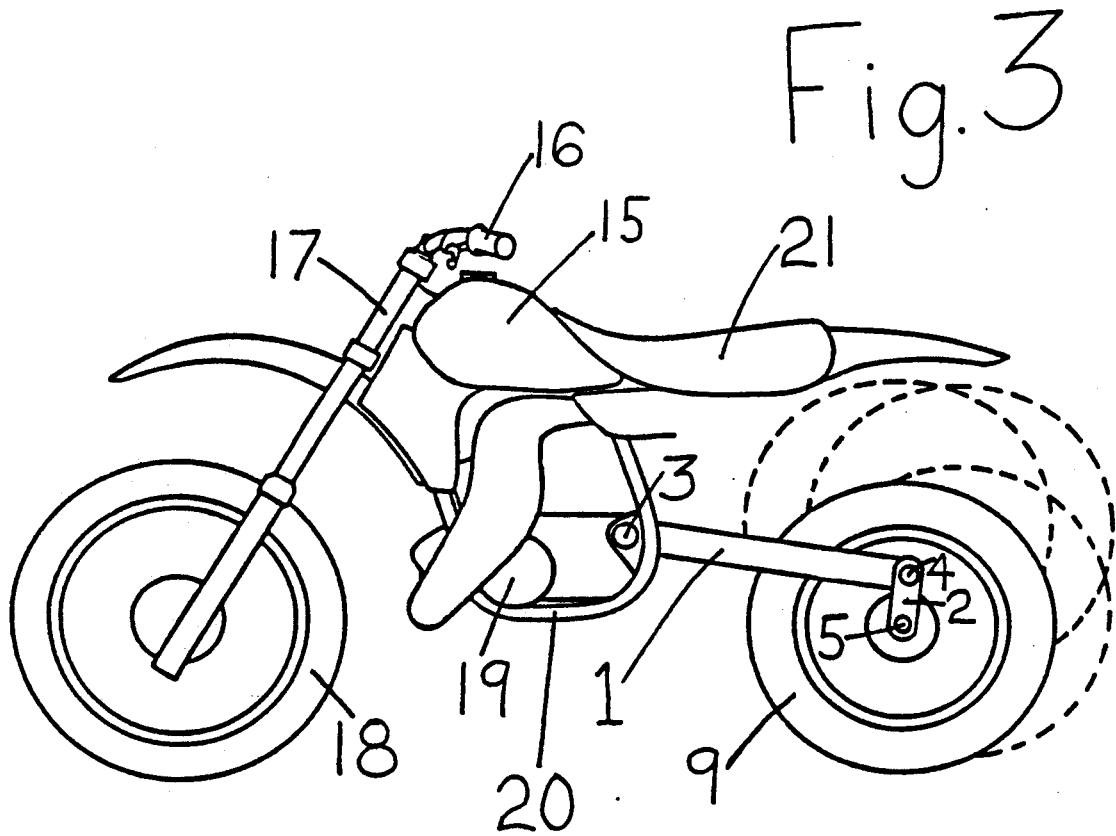
FIG. 3 is a side view of a complete motorcycle with phantom lines to illustrate the two dimensional motion of the rear wheel.
Figure 4:
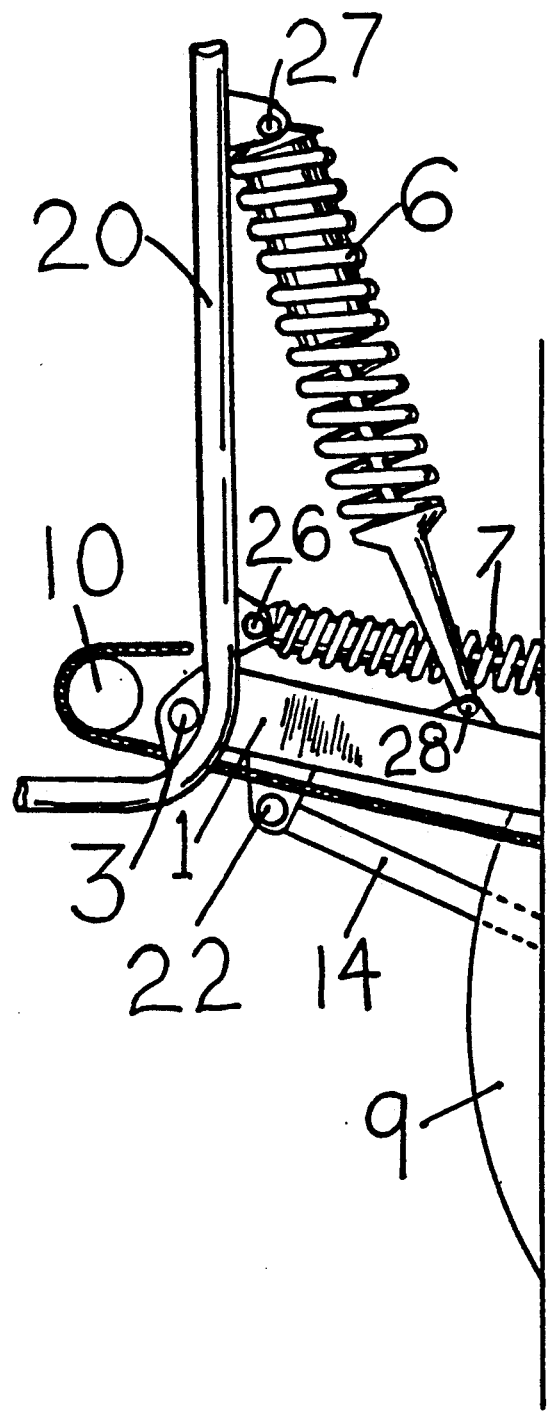
FIG. 4 is a side view of the suspension components. It shows the horizontal shock absorber mounted to the frame rather than the first swing arm.

FIG. 3 is a side view of a motorcycle with phantom lines to illustrate the two dimensional motion of the rear wheel. The figure shows a front wheel 18, front fork 17, handlebars 16, fuel tank 15, seat 21, engine 19. First swing arm 1 is pivotally mounted to the chassis system 20 at pivot axis 3. Swing arm assembly 2 is pivotally mounted to swing arm 1 at pivot axis 4. Wheel 9 is rotatably mounted to swing arm assembly 2 at axis 5. FIG. 4 is a side view of the suspension components. It shows the horizontal shock absorber 7 mounted to the chassis system 20 rather than the first swing arm 1 as in FIG. 1. It shows the first swing arm 1 pivotally mounted to the chassis system 20 at pivot axis 3. Shock absorber 6 is mounted to swing arm 1 at shock mount 28. Shock absorber 6 resiliently connects swing arm 1 to chassis system 20 at shock mount 27. Also shown are output drive sprocket 10, wheel 9, brake anchoring arm 14, and brake anchor mount 22.

3

Figure 5:
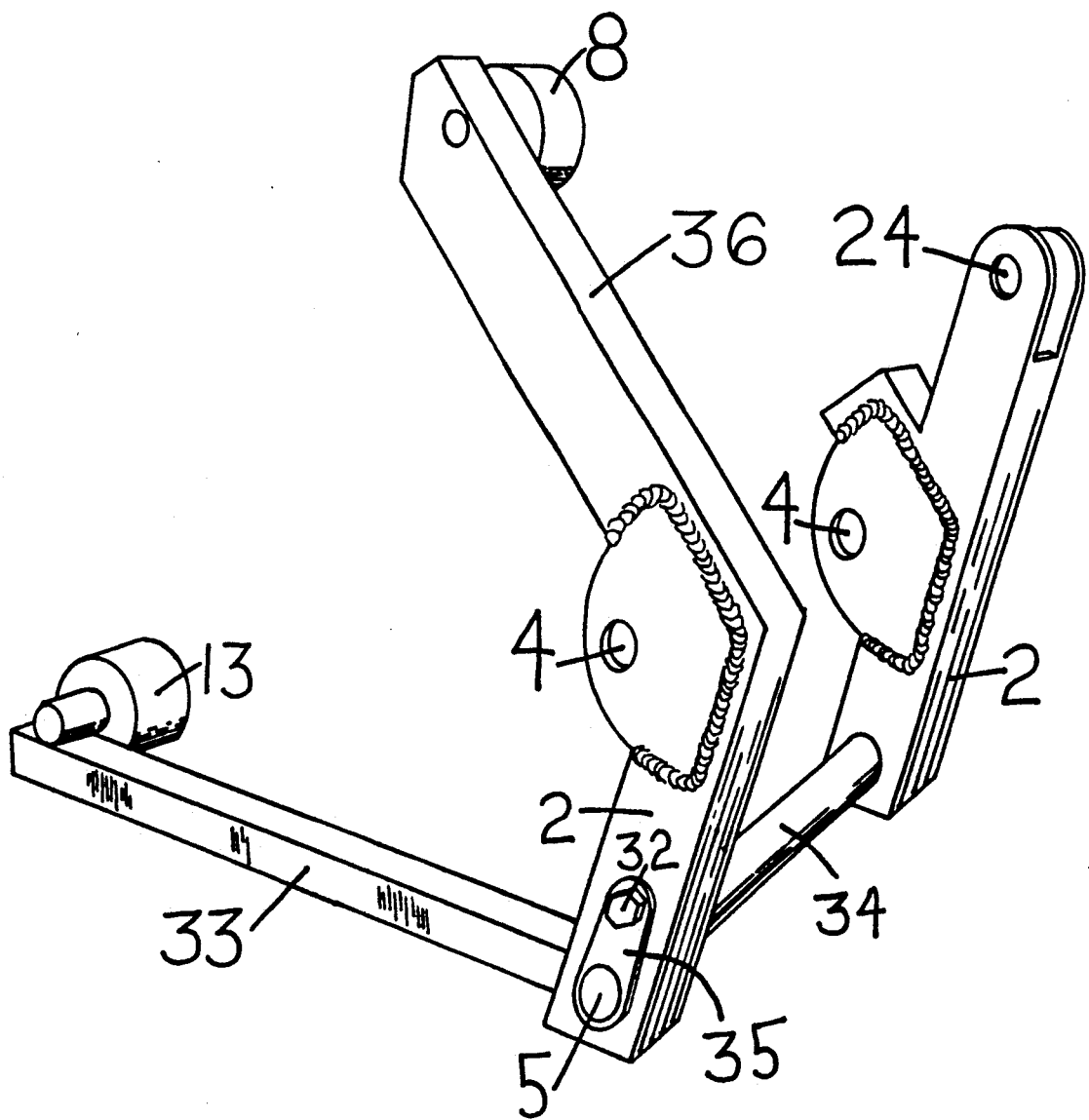
FIG. 5 is a perspective view of the second swing arm assembly, with a rigid mounted chain manipulation arm.

FIG. 5 is a perspective view of the second swing arm assembly with a chain manipulation arm 33 rigidly mounted to the left leg of swing arm assembly 2. It shows the main legs of the swing arm assembly 2 connected through axle 34. When assembled the axle 34 is rigidly connected to the legs of swing arm 2. Shown on the left leg of swing arm assembly 2 is a bolt 32. This bolt 32 secures axle 34 to the left leg of swing arm 2 through tab portion 35. It is very important that both legs of swing arm assembly 2 be rigidly secured to axle 34 to prevent twisting. Means for securing the right leg of swing arm 2 is not shown. For ease of manufacture, assembly and disassembly a splined axle 34 may be preferable. On the upper portion of the right side of the swing arm assembly 2 is the shock mount 24. On the left side of swing arm assembly 2 is rigidly mounted an upward extending member 36. Guide mechanism 8 is mounted to the upward extending member 36. Chain manipulation roller 13 is rotatably attached to chain manipulation arm 33. Pivot axis 4 is shown by the bolt holes for mounting. For reference the rotational axes 5 of the wheel is shown.

Figure 6:
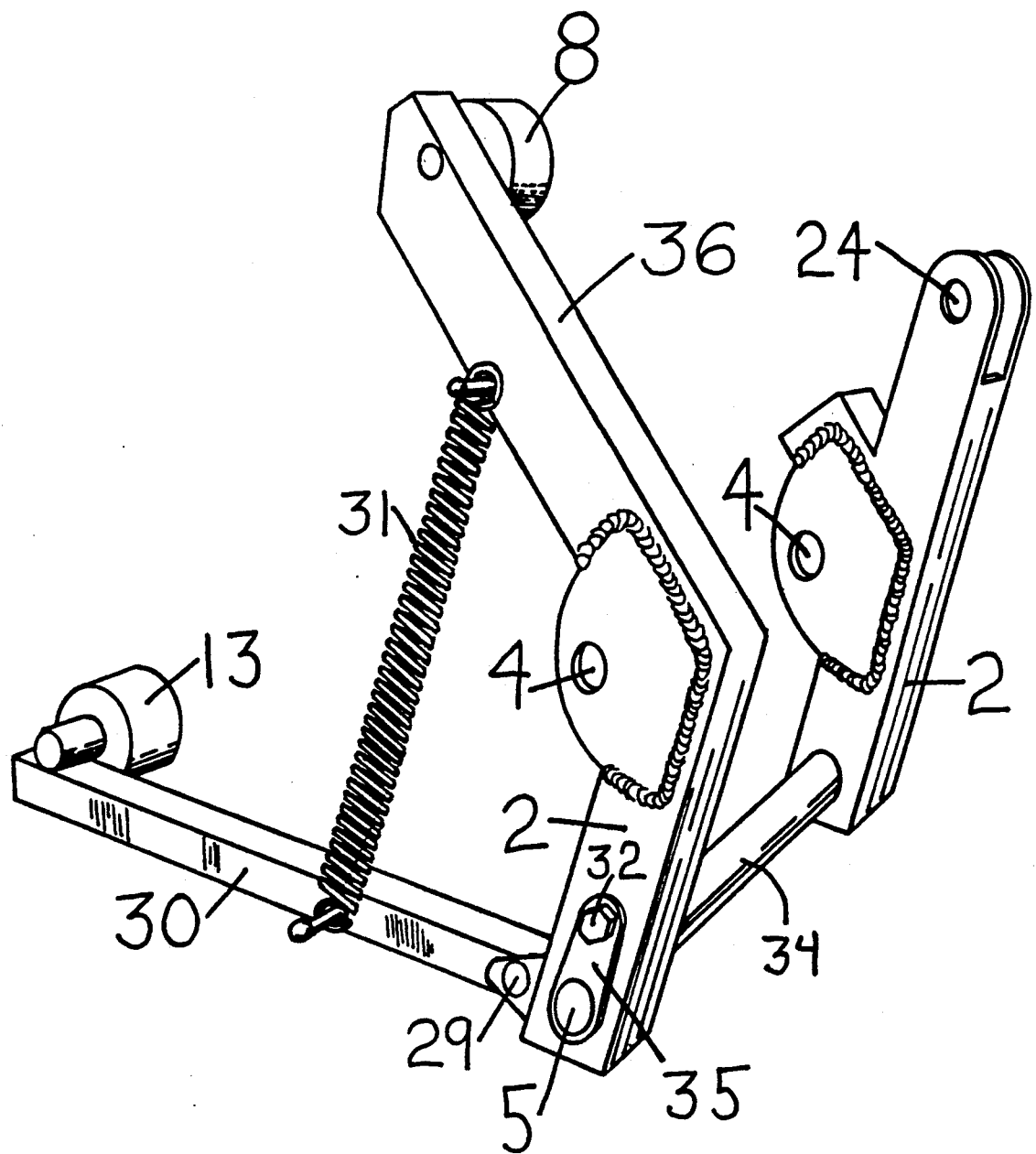
FIG. 6 is a perspective view of the second swing arm assembly with a pivotally mounted chain manipulation arm with resilient connecting means.

FIG. 6 is the same as FIG. 5 except that the chain manipulation arm 30 is pivotally connected to swing arm 2 at bracket 29 and spring 31 connects chain manipulation arm 30 to upper portion of the left side of swing arm 2. Guide mechanism 8 is mounted to the upward extending member 36. Chain manipulation roller 13 mounts to the forward portion of chain manipulation arm 30. Shock absorber mount 24 is shown on the upper extension of the right side of swing arm 2. Pivot axis 4 is shown by the bolt holes for mounting. On the left leg of swing arm 2 is a bolt 32 for securing axle 34 through tab portion 35. For reference the rotational axes 5 of the wheel is shown.

It should be known that management of the chain slack can be accomplished by a near endless array of mechanical lash-ups. Shown here is a simple precise system. Other systems may be employed without escaping the scope of this invention.

What is claimed is:

1. In a motorcycle having a chassis system comprised of a frame, an engine and a power transmission assembly, a front wheel, a rear wheel and a power output shaft, means for suspending the rear wheel from the chassis system comprising:
    a first swing arm pivotally mounted to said chassis system and extending rearwardly;
    a first resilient means operatively connecting said first swing arm to said chassis system;
    a second swing arm assembly pivotally mounted to the rearward portion of said first swing arm and extending downward;
    an upward extending member rigidly mounted to said second swing arm assembly;
    a guide mechanism mounted to said upward extending member; a second resilient means operatively connecting said second swing arm assembly to said first swing arm;
    the rear wheel rotatably mounted to the said second swing arm assembly;
    and means operatively connecting a single loop drive from said power output shaft to said rear wheel over said guide mechanism, wherein said rear wheel has freedom of motion in any direction relative to the chassis system, within its plane of rotation.

2. A motorcycle as claimed in claim 1 where one of the said resilient means is a shock absorber.

3. A motorcycle as claimed in claim 1 where said first and second resilient means are shock absorbers.

4. A motorcycle as claimed in claim 1 where said guide mechanism is a roller.

5. A motorcycle as claimed in claim 1 where said guide mechanism is a sprocket.

6. A motorcycle as claimed in claim 1 where said second swing arm assembly has a rigidly mounted manipulation arm for managing said loop drive.

7. A motorcycle as claimed in claim 1 where said second swing arm assembly has a pivotally mounted manipulation arm for managing said loop drive.

8. A motorcycle as claimed in claim 1 where said manipulation arm is resiliently mounted.

9. A motorcycle as claimed in claim 1 where said loop drive is a chain.

10. In a motorcycle having a chassis system comprised of a frame, an engine and a power transmission assembly, a front wheel, a rear wheel and a power output shaft, means for suspending the rear wheel from the chassis system comprising:
    a first swing arm pivotally mounted to said chassis system and extending rearwardly;
    a first resilient means operatively connecting said first swing arm to said chassis system;
    a second swing arm assembly pivotally mounted to the rearward portion of said first swing arm and extending downward;
    an upward extending member rigidly mounted to said second swing arm assembly;
    a guide mechanism mounted to said upward extending member; a second resilient means operatively connecting said second swing arm assembly to said chassis system;
    the rear wheel rotatably mounted to the said second swing arm assembly;
    and means operatively connecting a single loop drive from said power output shaft to said rear wheel over said guide mechanism, wherein said rear wheel has freedom of motion in any direction relative to the chassis system, within its plane of rotation.

11. A motorcycle as claimed in claim 10 where one of the said resilient means is a shock absorber.

12. A motorcycle as claimed in claim 10 where said first and second resilient means are shock absorbers.

13. A motorcycle as claimed in claim 10 where said guide mechanism is a roller.

14. A motorcycle as claimed in claim 10 where said guide mechanism is a sprocket.

15. A motorcycle as claimed in claim 10 where said second swing arm assembly has a rigidly mounted manipulation arm for managing said loop drive.

16. A motorcycle as claimed in claim 10 where said second swing arm assembly has a pivotally mounted manipulation arm for managing said loop drive.

17. A motorcycle as claimed in claim 16 where said manipulation arm is resiliently mounted.

18. A motorcycle as claimed in claim 10 where said loop drive is a chain.

* * * * *